US012111500B2

(12) United States Patent
Shikama et al.

(10) Patent No.: US 12,111,500 B2
(45) Date of Patent: Oct. 8, 2024

(54) OPTICAL FIBER GUIDE STRUCTURE AND OPTICAL FIBER CONNECTING STRUCTURE

(71) Applicant: Nippon Telegraph and Telephone Corporation, Tokyo (JP)

(72) Inventors: Kota Shikama, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 238 days.

(21) Appl. No.: 17/615,259

(22) PCT Filed: Jun. 3, 2019

(86) PCT No.: PCT/JP2019/021944
§ 371 (c)(1),
(2) Date: Nov. 30, 2021

(87) PCT Pub. No.: WO2020/245865
PCT Pub. Date: Dec. 10, 2020

(65) Prior Publication Data
US 2022/0236488 A1    Jul. 28, 2022

(51) Int. Cl.
*G02B 6/36*    (2006.01)
*G02B 6/30*    (2006.01)

(52) U.S. Cl.
CPC ............ *G02B 6/3608* (2013.01); *G02B 6/30* (2013.01); *G02B 6/3644* (2013.01)

(58) Field of Classification Search
CPC .. G02B 6/3809; G02B 6/4285; G02B 6/3656; G02B 6/366; G02B 6/3696
See application file for complete search history.

(56) References Cited

U.S. PATENT DOCUMENTS

| 4,740,051 | A | * | 4/1988 | Paust | G02B 6/3801 385/70 |
| 4,744,619 | A | * | 5/1988 | Cameron | G02B 6/4212 385/52 |
| 4,848,870 | A | * | 7/1989 | Wisecarver | G02B 6/3841 385/78 |
| 5,146,522 | A | * | 9/1992 | Pavlath | G02B 6/4248 359/900 |
| 5,381,494 | A | * | 1/1995 | O'Donnell | G02B 6/4202 385/91 |

(Continued)

FOREIGN PATENT DOCUMENTS

| CN | 106383381 A | 2/2017 |
| JP | S584111 A | 1/1983 |

(Continued)

*Primary Examiner* — Rhonda S Peace
(74) *Attorney, Agent, or Firm* — Slater Matsil, LLP

(57) ABSTRACT

An optical fiber guide structure includes a guide member that is configured to be erected on a connection end surface of an optical waveguide device and forms a space for accommodating a leading end portion of an optical fiber to be connected to the optical waveguide device. The guide member is formed of an elastically deformable material, and in a specific region a longitudinal direction of the guide member, and a diameter of an inscribed circle in contact with an inner wall of the guide member in a plane perpendicular to the longitudinal direction is smaller than an outer diameter of the optical fiber.

9 Claims, 14 Drawing Sheets

(56) References Cited

U.S. PATENT DOCUMENTS

| | | | | |
|---|---|---|---|---|
| 5,631,989 | A * | 5/1997 | Koren | G02B 6/423 |
| | | | | 385/91 |
| 5,854,869 | A * | 12/1998 | Joyce | G02B 6/424 |
| | | | | 385/94 |
| 7,394,963 | B2 * | 7/2008 | Hartlef | G02B 6/4471 |
| | | | | 385/136 |
| 11,415,761 | B2 * | 8/2022 | Shikama | G02B 6/423 |
| 11,747,577 | B2 * | 9/2023 | Sato | G02B 6/4232 |
| | | | | 385/88 |
| 11,934,010 | B2 * | 3/2024 | Muranaka | G02B 6/30 |
| 11,966,082 | B2 * | 4/2024 | Muranaka | G02B 6/4214 |
| 2018/0372960 | A1 | 12/2018 | Wohlfeil | |
| 2019/0384013 | A1 * | 12/2019 | Nakagawa | G02B 6/3874 |
| 2021/0157071 | A1 * | 5/2021 | Shikama | G02B 6/4243 |
| 2022/0229240 | A1 * | 7/2022 | Shikama | G02B 6/262 |
| 2022/0236488 | A1 * | 7/2022 | Shikama | G02B 6/30 |
| 2022/0260786 | A1 * | 8/2022 | Shikama | G02B 6/30 |

FOREIGN PATENT DOCUMENTS

| | | |
|---|---|---|
| JP | H2304405 A | 12/1990 |
| JP | H05164941 A | 6/1993 |
| JP | H10186163 A | 7/1998 |
| JP | 2002139644 A | 5/2002 |
| JP | 2002357737 A | 12/2002 |
| JP | 2003344716 A | 12/2003 |
| JP | 2004078028 A | 3/2004 |
| JP | 201357721 A | 3/2013 |

\* cited by examiner

- PRIOR ART -

- PRIOR ART -

OPTICAL FIBER GUIDE STRUCTURE AND OPTICAL FIBER CONNECTING STRUCTURE

CROSS-REFERENCE TO RELATED APPLICATIONS

This application is a national phase entry of PCT Application No. PCT/JP2019/021944, filed on Jun. 3, 2019 which application is hereby incorporated herein by reference.

TECHNICAL FIELD

The present invention relates to optical fiber guide structures and optical fiber connection structures, and particularly relates to optical fiber guide structures and optical fiber connection structures for connecting optical fibers to optical waveguide devices.

BACKGROUND

In recent years, there has been a demand for a significant increase in communication capacity within and between data centers accompanying the increase in traffic consumption by individuals using video services, and the increase in traffic by corporations using the Internet of Things (IoT), cloud services, and the like. To achieve the increase in communication capacity, an optical interconnection technology using an optical transmission technology or the like used in optical communications has been introduced in place of a conventional short-distance communication method using electric signals.

In a typical method of the optical interconnection, signal processing is implemented by transmission between a light emitting element such as a laser diode (LD) and a light receiving element such as a photo diode (PD) disposed on a printed circuit board, by using optical transmission media such as an optical waveguide and an optical fiber.

In some transmission methods, an optical modulation element and the like are integrated with or discretely connected to a light emitting element, and further a driver for converting electricity to light and the like are connected thereto. A configuration including the above-mentioned light emitting element, optical modulation element, driver, and the like is mounted on a printed circuit board as an optical transmitter. Similarly, an optical processor and the like are appropriately integrated with or discretely connected to a light receiving element, and further an electric amplification circuit for converting light to electricity and the like are connected thereto. A configuration including the above-mentioned light receiving element, optical processor, electric amplification circuit, and the like is mounted on the printed circuit board as an optical receiver.

An optical transceiver obtained by integrating the optical transmitter and the optical receiver, and the like are mounted in a package or on the printed circuit board, and are optically connected to optical transmission media such as an optical fiber, thereby achieving the optical interconnection. Further, the optical interconnection is achieved via a repeater such as an optical switch in some topologies.

As the light emitting element, the light receiving element, and the optical modulation element, elements using materials such as semiconductors of silicon, germanium and the like, and group III-V semiconductors represented by indium phosphide (InP), gallium arsenide (GaAs), indium gallium arsenide (InGaAs) and the like, have been put into practical use. In recent years, optical waveguide-type optical transceivers in which, along with the above-described elements, a silicon optical circuit, an indium phosphide optical circuit, and the like having a light propagation mechanism are integrated have been developed. A ferroelectric-based material such as lithium niobate, a polymer material, or the like may be used, in addition to the semiconductors, for the optical modulation element.

Further, an optical functional element including a planar lightwave circuit or the like made of quartz glass or the like may also be integrated along with the light emitting element, the light receiving element, and the optical modulation element. Examples of the optical functional element include a splitter, a wavelength multiplexer/demultiplexer, an optical switch, a polarization control element, and an optical filter. Hereinafter, a device in which the above-described light emitting element, light receiving element, optical modulation element, optical functional element, optical amplification element, and the like having the light propagation and waveguide mechanisms are integrated, is referred to as an "optical waveguide device".

The optical waveguide device is typically connected to an optical fiber array integrated with glass or the like in which V grooves are formed. In this structure, it is required that each core of the optical fibers and a core of a corresponding waveguide of the optical waveguide device be connected with low loss. In order to achieve the connection with low loss, it is necessary for the optical waveguide device and the optical fibers to be positioned (hereinafter, this is referred to as "alignment") with submicron accuracy and fixed to each other. According to the conventional optical waveguide device, light is actually input and output to carry out alignment (optical alignment) while monitoring the power, and the optical waveguide device is mounted in a package, on a board, or the like in a state of being integrated with the optical fiber array. However, the handling of the optical fibers is complicated, and thus it is necessary to align and fix the optical waveguide device and the optical fibers more simply.

A number of methods for simply positioning and fixing an optical waveguide device and optical fibers have been proposed. A representative method of simplification is to change the optical alignment method described above to a method in which alignment is made by mechanical positioning.

As one method for alignment by mechanical positioning, a method is proposed in which an optical fiber guide component having a plurality of guide holes for insertion of optical fibers is aligned with and fixed to an optical waveguide device in advance by optical alignment or the like, and then optical fibers are inserted into the guide holes of the optical fiber guide component and fixed thereto on a board or in a package (see Patent Literature (PTL) 1). As illustrated in FIGS. 9A and 9B, an optical fiber guide component 80 described in PTL 1 is constituted by a V groove substrate 801, in which a plurality of V grooves 801a are formed, dummy optical fibers 60a disposed in two V grooves on both sides of the plurality of V grooves 801a, and a lid 802 formed in a flat plate shape and integrated with the V groove substrate 801 by an adhesive layer 803.

As illustrated in a plan view of FIG. 9A and a cross-sectional view of FIG. 9B, the optical fiber guide component 80 is integrated with an optical waveguide device 7 by an adhesive 82 or the like. The optical waveguide device 7 includes a waveguide substrate 71 and an optical waveguide layer 72 formed on the waveguide substrate 71, and the optical waveguide layer 72 includes a clad 722 formed on the waveguide substrate 71 and a core 721 formed inside the clad 722. An optical fiber 60 is fixed to a plug 61. A connector receptacle (not illustrated) is fixed to the optical fiber guide component 80. When the plug 61 is inserted into and fitted to the connector receptacle, the optical fiber 60 is inserted into a guide hole 81 formed by the V groove 801a of the V groove substrate 801 and the lid 802 of the optical fiber guide component 80, and is positioned. Then, an end surface of the optical fiber 60 is brought into contact with an end surface of the core 721 of the optical waveguide device 7. Thus, the optical fiber 60 and the core 721 of the optical waveguide device 7 are optically connected to each other. To reinforce the adhesion between the optical waveguide device 7 and the optical fiber guide component 80, a reinforcement plate 81 made of glass is pasted onto the optical waveguide device 7.

The guide hole 81 and guide holes 8ia of the optical fiber guide component 80 are formed by the V grooves 801a and the lid 802, and the diameter of the guide holes is determined by the diameter of the dummy optical fibers 60a disposed in the two V grooves 801a on both sides. In order to enable the insertion of the optical fiber 60 into the guide hole, the guide hole is set to have a slightly larger diameter than the optical fiber 60. When a difference in diameter between the guide hole and the optical fiber 60 is defined as clearance, a submicron level of clearance is required. In other words, the diameter of the dummy optical fiber 60a is set to be larger than the diameter of the optical fiber 60.

However, in the technique described above, since a step of manufacturing the optical fiber guide component 80 with high accuracy in advance, and a step of optically aligning, bonding, and fixing the optical fiber guide component 80 onto the optical waveguide device 7 with high accuracy are required, it cannot be said that the work to form the optical fiber guide structure is satisfactorily simplified. In addition, in the configuration described above, the guide hole 81 must have an inner diameter larger than the outer diameter of the optical fiber 60, and the clearance accompanying the difference in the diameters thereof, that is, the difference between the inner diameter of the guide hole and the outer diameter of the optical fiber causes connection loss to increase.

CITATION LIST

Patent Literature

PTL 1: JP 2004-078028 A

SUMMARY OF THE INVENTION

Technical Problem

Embodiments of the present invention have been conceived to solve the problems described above, and an object of embodiments of the present invention is to provide an optical fiber guide structure and an optical fiber connection structure able to achieve an optical connection with low loss between an optical waveguide device and an optical fiber while simply forming the optical fiber guide structure.

Means for Solving the Problem

In order to accomplish the object described above, an optical fiber guide structure according to embodiments of the present invention includes a guide member (10) that is configured to be erected on a connection end surface of an optical waveguide device and forms a space for accommodating a leading end portion of an optical fiber to be connected to the optical waveguide device. The guide member is formed of an elastically deformable material, and in a specific region (102) along a longitudinal direction of the guide member, a diameter of an inscribed circle (C1) in contact with an inner wall of the guide member in a plane perpendicular to the longitudinal direction is smaller than an outer diameter of the optical fiber (60).

In the optical fiber guide structure according to an embodiment of the present invention, the guide member (10) may include a projecting portion (102a) which is formed in a cylindrical shape and in which a part of a wall surface of the guide member projects toward an inner side of the space in the specific region, and, in a case where an optical fiber is inserted, a compressive stress in a radial direction of the optical fiber may be applied to the optical fiber by the elastic deformation of the part of the wall surface by the projecting portion.

In the optical fiber guide structure according to an embodiment of the present invention, the guide member (20) may be formed in a cylindrical shape and include a plurality of slits (SL) formed along a longitudinal direction on a side on which the optical fiber is inserted. In at least a specific region of a region where the plurality of slits are formed within the guide member, a diameter of an inscribed circle (C2) in contact with an inner wall of the guide member in a plane perpendicular to the longitudinal direction may be set to be smaller than the outer diameter of the optical fiber.

In the optical fiber guide structure according to an embodiment of the present invention, the guide member (30) may be constituted by N (N is an integer equal to or greater than three) support members (30); each of the N support members may include a beam (301) having one end connected to another member, and a plate spring (302) extending along a longitudinal direction from the other end side of the beam; and the plate spring of each of the N support members may be configured such that a diameter of an inscribed circle (C3) in contact with the plate spring in a plane perpendicular to the longitudinal direction is smaller than the outer diameter of the optical fiber in at least a specific region along the longitudinal direction.

In the optical fiber guide structure according to an embodiment of the present invention, the guide member (40) may include a cylindrical member (401) formed in a cylindrical shape and having either a through-hole or a notch that opens in a part of the cylindrical member along the longitudinal direction; a contact member (403) disposed in either the through-hole or the notch and configured to make contact with a side surface of an optical fiber in a case where the optical fiber is inserted; and a spring member (402) that is set between the cylindrical member and the contact member. In at least a specific region of the contact member, a diameter of an inscribed circle (C4) in contact with an inner wall of the cylindrical member and an inner surface of the contact member in a plane perpendicular to the longitudinal direction may be set to be smaller than the outer diameter of the optical fiber.

In the optical fiber guide structure according to an embodiment of the present invention, the guide member (50) may include a first cylindrical member (501); a second cylindrical member (503) having a slit (SL) formed along an axial direction in a side surface thereof; and a coupling member (502) configured to couple the first cylindrical member and the second cylindrical member to each other while matching the axes thereof. An inner diameter of the second cylindrical member may be set to be smaller than an outer diameter of an optical fiber to be inserted into the second cylindrical member.

In the optical fiber guide structure according to an embodiment of the present invention, a diameter of an inscribed circle that is inscribed with respect to the guide member in a plane perpendicular to the longitudinal direction may be set to be larger toward an end portion of the guide member on a side where an optical fiber is to be inserted.

An optical fiber connection structure according to embodiments of the present invention includes a reinforcement member (11) provided near a connection end surface on one surface of an optical waveguide device (7) formed in a plate shape, and an optical fiber guide structure that is configured to be erected on a surface formed by the connection end surface of the optical waveguide device and the reinforcement member, where the optical fiber guide structure is the optical fiber guide structure mentioned earlier.

Effects of Embodiments of the Invention

According to embodiments of the present invention, an optical fiber guide structure for connecting an optical waveguide device and an optical fiber may be simply formed directly on an optical waveguide end surface. In addition, while being guided by the optical fiber guide structure, it is possible to achieve an optical connection with low loss between the optical waveguide device and the optical fiber without an axial deviation accompanying the insertion of the optical fiber.

BREIF DESCRIPTION OF THE DRAWINGS

DETAILED DESCRIPTION OF ILLUSTRATIVE EMBODIMENTS

Hereinafter, embodiments of the present invention will be described with reference to the drawings.

First Embodiment

An optical fiber connection structure according to a first embodiment of the present invention will be described with reference to FIGS. 1A to 1F. An optical fiber connection structure 1 according to the first embodiment of the present invention includes a guide member 10 configured to optically connect an optical waveguide device 7 and an optical fiber 60.

Figure 1A:
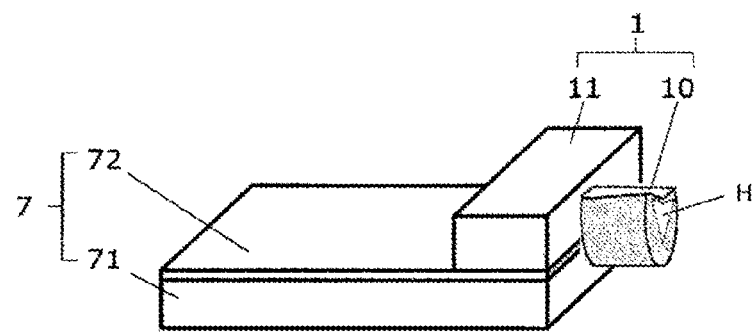
FIG. 1A is a perspective view schematically illustrating an optical fiber guide structure according to a first embodiment of the present invention.
Figure 1B:
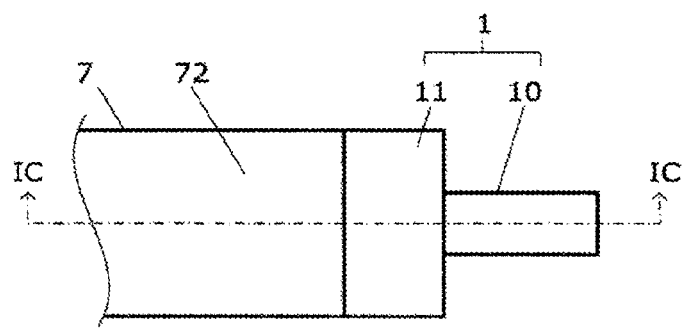
FIG. 1B is a top view schematically illustrating an optical fiber guide structure according to the first embodiment of the present invention.

The optical fiber connection structure 1 includes, for example, a reinforcement plate 11 provided near a connection end surface on one surface of the optical waveguide device 7 formed in a plate shape, and the guide member 10 erected on the connection end surface of the optical waveguide device 7 and a side surface of the reinforcement plate 11, as illustrated in FIG. 1A. The guide member 10 constitutes an optical fiber guide structure configured to guide an optical fiber.

The optical waveguide device 7 is a device including an optical waveguide 72 using, for example, a thin silicon wire as a core 721. This may be manufactured using a well-known silicon on insulator (SOI) substrate and the like. A surface silicon layer of an SOI substrate is patterned by known photolithography and etching techniques, and the like, so as to form a core layer that constitutes the optical waveguide (optical circuit). Next, for example, silicon oxide is deposited by a well-known deposition method such as plasma CVD to form an upper clad layer. This makes it possible to form the optical waveguide in which a buried insulating layer is made to be a lower clad layer, and the core layer made of the thin silicon wire and formed on the lower clad layer is covered with the upper clad layer. The optical waveguide device 7 may be, for example, a planar lightwave circuit made of a quartz glass thin film formed through deposition on a silicon substrate. The present invention is not limited thereto as long as the device is an optical waveguide device having a waveguide mechanism. For example, as the substrate, the optical waveguide, or the like, in addition to quartz glass, a resin formed of organic material, a semiconductor or compound semiconductor waveguide of Si, silicon nitride (SiN), gallium arsenide, indium phosphorus (InP) or the like, and a dielectric such as lithium niobate (LN) and periodically poled lithium niobate (PPLN) may be used.

In the optical waveguide device 7, various signal processing optical circuits for processing signals, and various optical functional elements for light emission, light reception, modulation, control, and the like may be integrated. In addition, optional optical functional elements such as an isolator, polarization rotation, a polarization separation element, and an optical attenuator may be integrated.

In the present embodiment, in the optical waveguide device 7, the connection end surface where one end of the optical waveguide 72 to be optically connected to the optical fiber 60 appears plays a meaningful role, and the optical fiber connection structure is not affected by other circuit configurations and circuit functions.

Meanwhile, the guide member 10 is a member configured to guide the optical fiber 60 by forming a space in which the leading end portion of the optical fiber 60 is accommodated. The guide member 10 is, for example, a cylindrical member formed of an elastically deformable material. As illustrated in FIGS. 1A to 1F, in the present embodiment, the guide member 10 includes a through-hole H having a substantially cylindrical shape and formed along an axis. A cross section of the through-hole H perpendicular to the axis is formed in a substantially triangular shape.

Furthermore, the guide member 10 includes a cylindrical portion 101 to be connected to the optical waveguide device 7 and the reinforcement plate 11, and a plate spring portion 102 formed in a specific region along the longitudinal direction thereof.

Figure 1C:
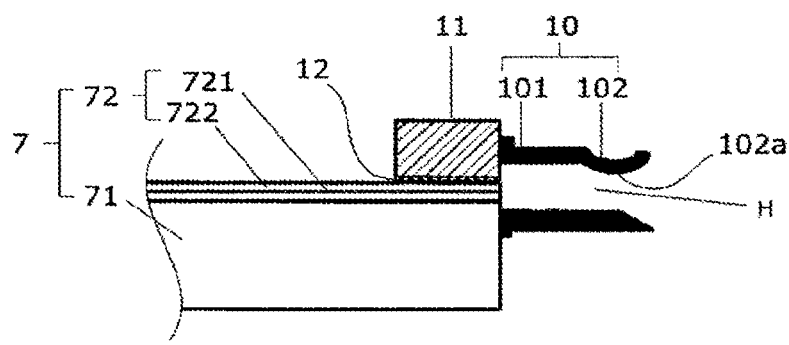
FIG. 1C is a cross-sectional view illustrating a cross section taken along a line IC-IC in FIG. 1B.
Figure 1D:
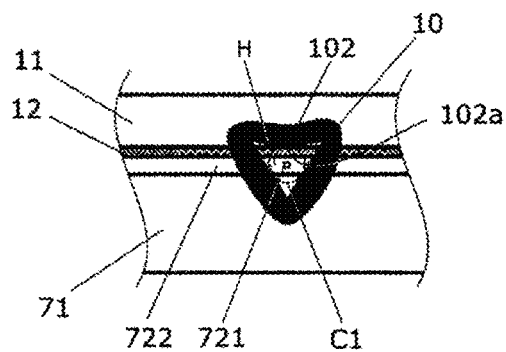
FIG. 1D is a front view schematically illustrating an optical fiber guide structure according to the first embodiment of the present invention.

The plate spring portion 102 is formed by a part of the guide member 10 being curved inward like a plate spring in a specific region along the longitudinal direction of the guide member 10. As illustrated in FIGS. 1C and 1D, the plate spring portion 102 forms a projecting portion 102a projecting toward an inner side of the space formed inside of the guide member 10, that is, toward an inner side of the through-hole H. As a result, in a plane passing through the plate spring portion 102 and being perpendicular to the longitudinal direction, the diameter of an inscribed circle C1 in contact with an inner wall of the guide member 10, that is, in contact with a substantially triangular shape formed by the through-hole H, is set to be slightly smaller than the outer diameter of the optical fiber 60. In other sections including the vicinity of the connection end surface of the waveguide device 7, the inner diameter of the inscribed circle is set to be substantially equal to or slightly larger than the outer diameter of the fiber.

As illustrated in FIG. 1D, the guide member 10 is formed such that the center of the inscribed circle C1 in contact with the inner wall of the guide member 10 coincides with the core 721 having come out to the connection end surface of the optical waveguide device 7 when viewed from the front. As described above, the optical waveguide device 7 is typically constituted by an optical waveguide substrate 71, and the optical waveguide layer 72 formed of the core 721 and a clad 722. The optical waveguide layer 72 is a thin layer having a thickness in a range from several micrometers to several tens of micrometers. Because of this, the reinforcement plate 11 is fixed in the vicinity of the end surface of the optical waveguide device 7 by adhesion or the like as a base for erecting the guide member 10.

The reinforcement plate 11 is a reinforcement member for reinforcing the adhesion between the optical waveguide device 7 and the guide member 10. The reinforcement plate 11 may be formed using any material such as glass, ceramics, metal, or the like. Metal joining or the like, other than the adhesion, may be used for fixing the reinforcement plate 11 to the optical waveguide device 7. One side surface of the reinforcement plate 11 is fixed to be flush with the connection end surface of the optical waveguide device 7. To be flush with the connection end surface, the reinforcement plate 11 may be fixed by using a mechanical jig or the like. After the reinforcement plate 11 is fixed onto the optical waveguide device 7, dicing, polishing, or the like may be performed as necessary.

One end of the guide member 10 is joined to the connecting end surface of the optical waveguide device 7 and the side surface of the reinforcement member 11 being flush with each other.

Figure 1E:
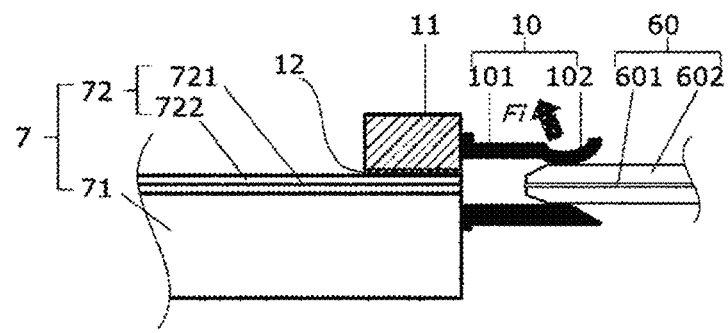
FIG. 1E is a schematic view illustrating an optical fiber guide structure and an optical fiber connection structure according to the first embodiment of the present invention.
Figure 1F:
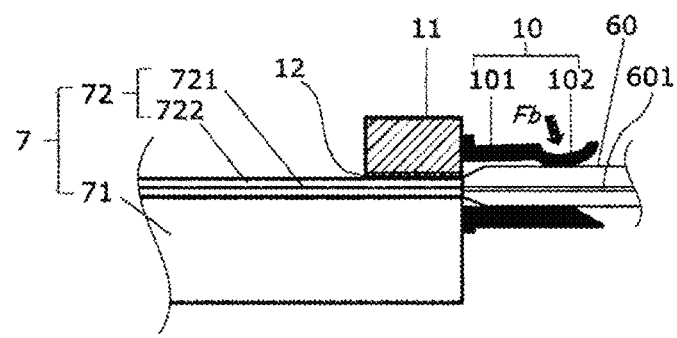
FIG. 1F is a schematic view illustrating an optical fiber guide structure and an optical fiber connection structure according to the first embodiment of the present invention.

As illustrated in FIGS. 1C, 1E, and 1F, the guide member 10 may be formed such that the diameter of the inscribed circle that is inscribed with respect to the inner wall of the guide member 10 in a plane perpendicular to the longitudinal direction becomes larger from the region where the plate spring portion 102 is formed toward an end portion of the guide member 10 on the side through which the optical fiber is inserted, that is, toward an insertion opening into which the optical fiber 60 is inserted. By increasing the diameter of the insertion opening in this manner, the insertion of the optical fiber 60 is facilitated.

The action of the guide member 10 when inserting the optical fiber 60 will be described with reference to FIGS. 1E and 1F. The leading end of the optical fiber 60 to be inserted is chamfered as illustrated in FIGS. 1E and 1F.

FIG. 1E illustrates a midway state in which the optical fiber 60 is being inserted, and FIG. 1F illustrates a state in which the insertion of the optical fiber 60 is completed.

As described above, in the region where the plate spring portion 102 is formed along the longitudinal direction, the diameter of the inscribed circle in contact with the inner wall of the guide member 10 is set to be slightly smaller than the outer diameter of the optical fiber 60 by the projecting portion 102a. Thus, when the optical fiber 60 is inserted into the through-hole H of the guide member 10, the optical fiber 60 is brought into contact with the inner wall of the guide member 10 in the region where the plate spring portion 102 is formed, that is, brought into contact first with the projecting portion 102a. When a force in the longitudinal direction is applied to the optical fiber 60 under the above state, a force Fi in the radial direction of the optical fiber 60 acts on the plate spring portion 102, and a part of the wall surface of the guide member 10 elastically deforms, as illustrated in FIG. 1E. Due to the elastic deformation of the part of the wall surface of the guide member 10, the inner diameter of the through-hole H in the region where the plate spring portion 102 is formed is temporarily expanded, so that the optical fiber 60 can be inserted.

Further, by pushing the optical fiber 60 toward the waveguide end surface side, the leading end of the optical fiber 60 reaches the waveguide end surface of the optical waveguide device 7, as illustrated in FIG. 1F. In this state, the elastic deformation generated when the optical fiber 60 is inserted remains in the plate spring portion 102. After the optical fiber 60 is further inserted, an elastic restoring force Fb brings the inner wall of the guide member 10 into close contact with the outer surface of the fiber 60, and the plate spring portion 102 of the guide member 10 applies a compressive stress in the radial direction of the optical fiber 60 to the optical fiber 60, as illustrated in FIG. 1F.

After the insertion of the optical fiber 60, the leading end surface of the optical fiber 60 and the connection end surface of the optical waveguide device 7 may be completely adhered to each other to eliminate an air layer so as to prevent reflection, or a refractive index matching material, an adhesive, or the like may be filled, as illustrated in FIG. 1F. The fiber may be fixed by an adhesive or the like as appropriate after the insertion.

Next, a method for manufacturing the above-mentioned guide member 10 will be described.

As a first method, the reinforcement plate 11 is fixed first on the top surface of the optical waveguide device 7 by using an adhesive. A film of a photoresist is formed on the connection end surface of the optical waveguide device 7 and the side surface of the reinforcement plate 11 by applying a photoresist represented by an ultraviolet (UV) curing resin, SU8, and the like. Instead of applying the photoresist, the connection end surface of the optical waveguide device 7 and the side surface of the reinforcement plate 11 may be put into a container filled with the photoresist to form a film of a photoresist.

Next, UV light emitted from a laser is collected and radiated onto the photoresist film via a predetermined optical system. At this time, the position to be irradiated with the UV light is scanned to form a structural body made of any desired light curing resin. Since the photoresist irradiated with UV light is light-cured, by scanning the position to be irradiated with the UV light, the resin is cured along the scanning trajectory, thereby making it possible to form the guide member 10. As for the UV light, for example, a light source and an optical system may be caused to perform scanning by using a motor, a piezo stage, or the like, or using a galvano-mirror, a deflection element, or the like.

As a second method, there is a method in which stereolithography is performed by using a femtosecond laser, as a laser, having a wavelength longer than the wavelength at which the light curing resin is cured. In this method, two-photon absorption of the wavelength at which the resin is cured due to a nonlinear effect is generated at a location where light has a constant light intensity by being collected. The light collecting location where the two-photon absorption is generated is scanned in a similar manner to the first method described above, thereby forming the guide member 10. This method, as is well known, makes it possible to perform high-accuracy and nano-level stereolithography. As described above, when the resin in the uncured region is removed after the resin is shaped by light curing, a three-dimensional structural object can be formed.

In an optical waveguide connection structure according to the present embodiment, in order to make the center of the inscribed circle C1 coincide with the center of the core 721 of the optical waveguide device 7 at the time of forming the guide member 10, the target core may be detected by using a high-accuracy camera monitor when forming a molding object, for example, and the guide member 10 may be formed with reference to the detected core.

As discussed above, with the optical fiber connection structure according to the present embodiment, a highly accurate fiber guide structure with submicron accuracy can be formed by being drawn directly on the connection end surface of the optical waveguide. Furthermore, since the region where the diameter of the inscribed circle is smaller than the outer diameter of the optical fiber 60 is elastically deformed and brought into contact with the inserted optical fiber 60, the optical axis position of the fiber can be uniquely determined, and as a result, it is possible to achieve a connection with low loss without clearance.

In addition, since the guide member 10 according to the present embodiment is formed of a light curing resin, the Young's modulus thereof is smaller than that of glass or the like by at least one order of magnitude, and the Poisson ratio is also larger, which makes it possible for the guide member 10 to be easily deformed even with a small stress.

The guide member 10 according to the present embodiment includes the plate spring portion 102 in a specific region along the longitudinal direction thereof. The plate spring portion 102 is formed by a part of the guide member 10 being curved inward like a plate spring. The plate spring portion 102 formed by curving a part of the guide member 10 functions like a plate spring, and is able to deform more easily. Regarding the degree of deformation of the plate spring portion 102, by making the thickness of the plate spring thinner or making the length of the plate spring longer, the deformation is facilitated even with a small force. Further, it is easy to change the orientation of the force Fi depicted in FIG. 1E by an angle of the chamfered portion of the optical fiber 60, and it is also easy to increase a stress component in a direction in which the hole diameter expands by changing the chamfer angle.

In the present embodiment, a light curing resin is formed directly on the optical waveguide device, and it is necessary to sufficiently secure a joining strength between the resin and the end surface of the optical waveguide device. For this purpose, as in FIGS. 1C, 1E, and 1F, the outer periphery of the base of the guide member 10 is set to be suitably large to widen the joining area, thereby making it possible to enhance the strength.

In FIGS. 1A to 1F, a case in which one optical fiber 60 is inserted into one through-hole H formed in the guide member 10 is exemplified and described. However, in the present invention, the number of holes, the number of optical fibers, or the like is not limited. For example, there may be formed a guide member in which a hole structure is appropriately provided in accordance with the number of cores present on the connection end surface of the optical waveguide device. By inserting a plurality of optical fibers into the above-discussed guide member, it is possible to achieve connections collectively. Such a structural object may have individual guide members formed for each of the corresponding cores, or may employ a structure including a plurality of holes in a single structural object.

In the present embodiment, a case in which the cross-sectional shape of the through-hole H formed in the guide member 10 is substantially triangular is exemplified and described, but the shape of the through-hole H is not limited to a triangular shape as long as the structure enables insertion and positioning of the optical fiber. For example, the cross-sectional shape of the through-hole may employ a shape, other than a triangle, such as a tetragon, a hexagon, a circle, an ellipse, or a shape obtained by deforming these shapes.

For the outer peripheral structure of the guide member 10, the cross section may be a circular shape, an elliptical shape, a triangular shape or any other polygonal shape, and the shape thereof can be optionally designed.

Second Embodiment

In FIGS. 2A to 2F, an outline of an optical fiber connection structure according to a second embodiment of the present invention is illustrated. Note that the same reference signs are used for the constituent elements common to the optical fiber connection structure according to the first embodiment, and detailed descriptions thereof will be omitted.

In an optical fiber connection structure 2 according to the present embodiment, similarly to the first embodiment, a guide member 20 made of a light curing resin is formed directly on the connection end surface of the optical waveguide device 7.

Figure 2A:
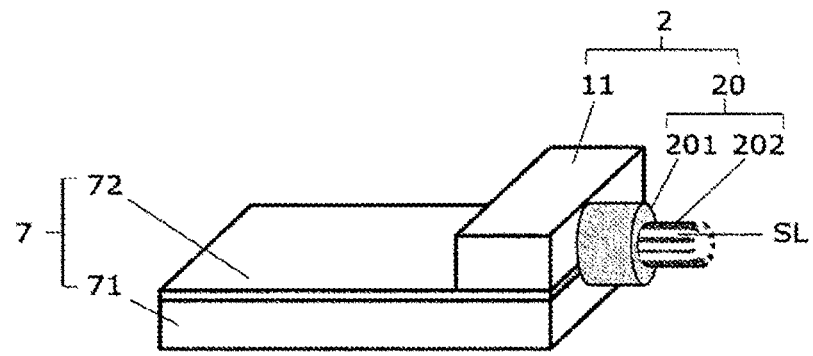
FIG. 2A is a perspective view schematically illustrating an optical fiber guide structure according to a second embodiment of the present invention.
Figure 2B:
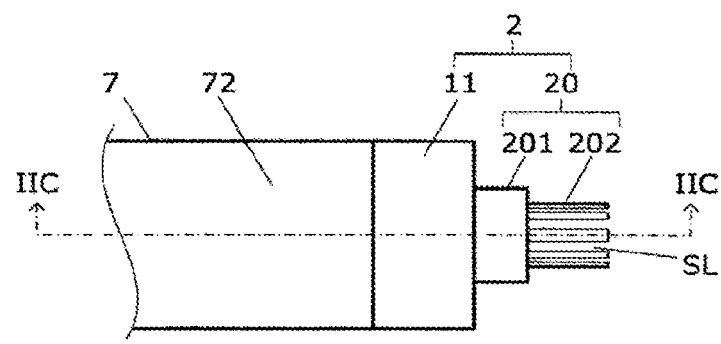
FIG. 2B is a top view schematically illustrating an optical fiber guide structure according to the second embodiment of the present invention.
Figure 2C:
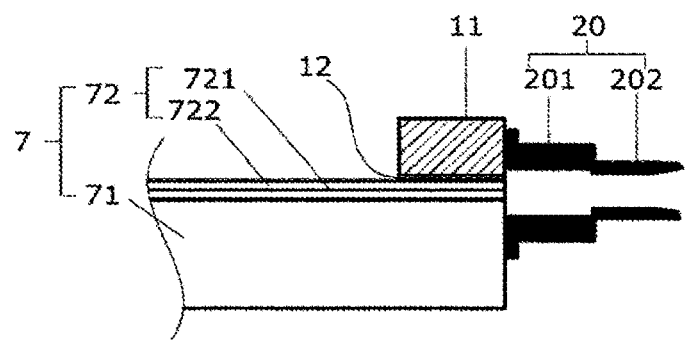
FIG. 2C is a cross-sectional view illustrating a cross section taken along a line IIC-IIC in FIG. 2B.

As illustrated in FIGS. 2A to 2C, the guide member 20 includes a first cylindrical portion 201 formed in a cylindrical shape on the whole and connected to the optical waveguide device 7, and a second cylindrical portion 202 coupled to the first cylindrical portion and positioned on a side where the optical fiber 60 is inserted. In the present embodiment, a cross section perpendicular to the axis of a through-hole which is provided in the first cylindrical portion 201 and the second cylindrical portion 202 and into which the optical fiber 60 is inserted, is considered to be circular.

A plurality of slits SL are formed in the second cylindrical portion 202 along the longitudinal direction. Accordingly, the configuration is such that a plurality of plate springs are disposed in the longitudinal direction in the second cylindrical portion 202, which is divided by the slits SL into sections separate from each other in a comb-like shape.

Figure 2D:
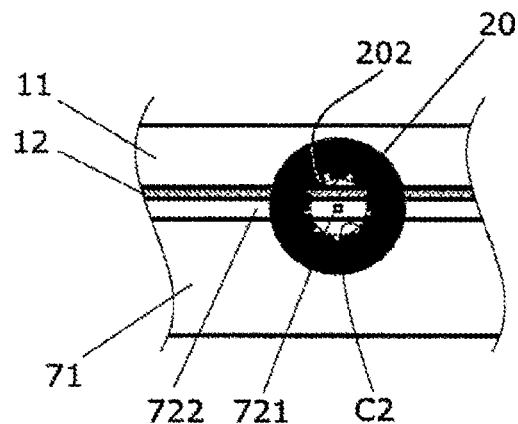
FIG. 2D is a front view schematically illustrating an optical fiber guide structure according to the second embodiment of the present invention.

As illustrated in FIG. 2C, the diameter of an inscribed circle in contact with the inner wall in at least a specific region of the second cylindrical portion 202 is smaller than the inner diameter of the first cylindrical portion 201. As illustrated in FIG. 2D, the diameter of an inscribed circle C2 in contact with the inner wall in at least a specific region of the second cylindrical portion 202 is set to be slightly smaller than the outer diameter of the optical fiber 60. As a result, the through-hole formed in the guide member 20 has an inner diameter larger than the outer diameter of the optical fiber 60 on the connection end surface side of the optical waveguide device 7, and has an inner diameter smaller than the outer diameter of the optical fiber 60 in a specific region on the side of an insertion opening.

In the present embodiment, as illustrated in FIG. 2C, the insertion of the fiber is guided by a tapered structure in which the diameter of the inscribed circle is partially set to be larger at an end surface of the guide member 20 on the insertion opening side for the optical fiber 60.

Figure 2E:
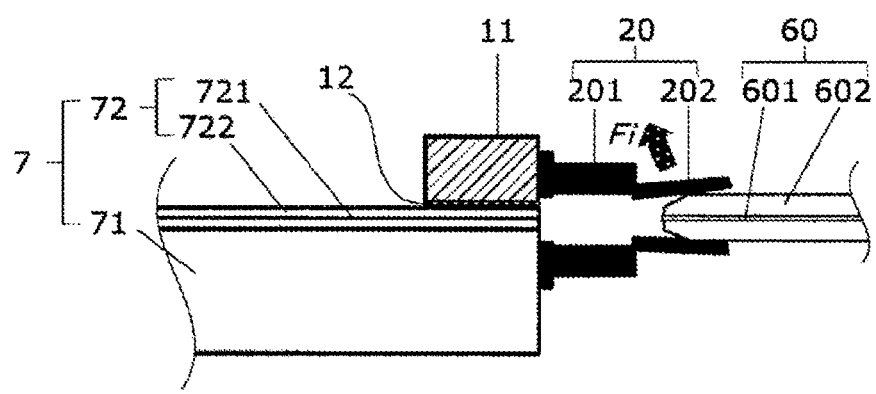
FIG. 2E is a schematic view illustrating an optical fiber guide structure and an optical fiber connection structure according to the second embodiment of the present invention.
Figure 2F:
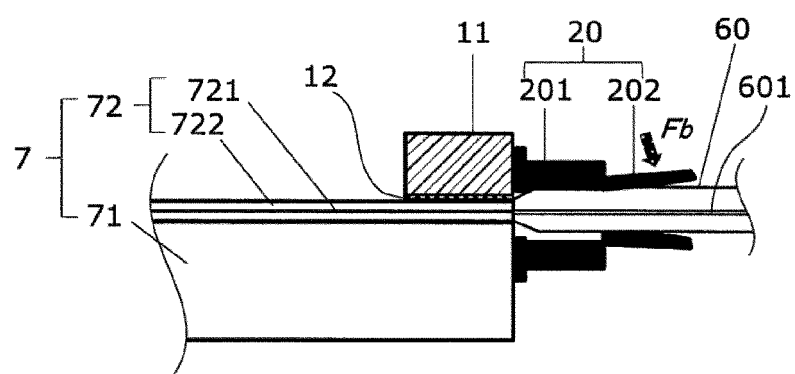
FIG. 2F is a schematic view illustrating an optical fiber guide structure and an optical fiber connection structure according to the second embodiment of the present invention.

Next, the action of the guide member 20 when inserting the optical fiber 60 will be described with reference to FIGS. 2E and 2F.

In at least a specific region in the longitudinal direction of the second cylindrical portion 202, the inscribed circle of the through-hole is smaller than the outer diameter of the optical fiber 60, similarly to the optical fiber connection structure according to the first embodiment. However, as illustrated in FIG. 2E, the plate spring of the second cylindrical portion 202 having the slits SL is elastically deformed by receiving a force Fi from the optical fiber 60, thereby allowing the optical fiber 60 to be inserted. After the insertion of the optical fiber 60, as illustrated in FIG. 2F, the second cylindrical portion 202 applies, to the optical fiber 60, a compressive stress in the radial direction of the optical fiber 60, whereby clearance between the optical fiber 60 and the guide member 20 may be eliminated.

In the present embodiment, a plurality of elongated rectangular plate springs are formed by providing the slits SL in the second cylindrical portion 202. The guide member 20 has a structure in which the plate springs elastically deform, whereby a substantial stress is hardly transmitted to the first cylindrical portion 201 located on the connection end surface side of the optical waveguide device 7. With the above structure, an effect that the clearance between the guide member 20 and the optical fiber 60 is eliminated and the optical fiber 60 can be connected to the optical waveguide device 7 with low loss, is exhibited. Furthermore, with the structure described above, the following effects may also be exhibited.

At the time of inserting the optical fiber 60, the plurality of plate springs formed in the second cylindrical portion 202 deform, so that the stress accompanying the insertion of the optical fiber 60 is unlikely to be transmitted to the joining portion of the first cylindrical portion 201 with the connection end surface of the optical waveguide device 7. Such a structure makes it possible to reduce the risk of the joining portion between the guide member 20 and the connection end surface of the optical waveguide device 7 peeling when the optical fiber 60 is inserted.

The length, thickness, and the like of the plate spring portion may be set appropriately in such a manner that the Young's modulus of the plate spring portion formed of a light curing resin becomes a suitable one in accordance with the joining strength between the optical waveguide device 7 and the guide member 20, the magnitude of the force received from the optical fiber 60 to be inserted, and the like.

Third Embodiment

Next, an optical fiber connection structure according to a third embodiment of the present invention will be described with reference to FIGS. 3A to 3F.

In an optical fiber connection structure 3 according to the present embodiment, an optical fiber guide structure is formed by four independent support members 30. Each of the support members 30 includes a beam 301 with one end thereof connected to the connection end surface of the optical waveguide device 7 or the side surface of a reinforcement plate 11, and a plate spring 302 extending along the longitudinal direction from the other end side of the beam 301. The beam 301 has a higher rigidity than the plate spring 302.

A plurality of the support members 30, similarly to the first embodiment, are each made of a light curing resin and formed directly on the connection end surface of the optical waveguide device 7 or on the side surface of the reinforcement plate 11. As described above, the optical fiber guide structure does not necessarily have to include a cylindrical portion closed in the circumferential direction of the optical fiber 60, and may be constituted by the plurality of support members 30 erected independently of each other, and more desirably constituted by three or more of the support members 30.

Figure 3A:
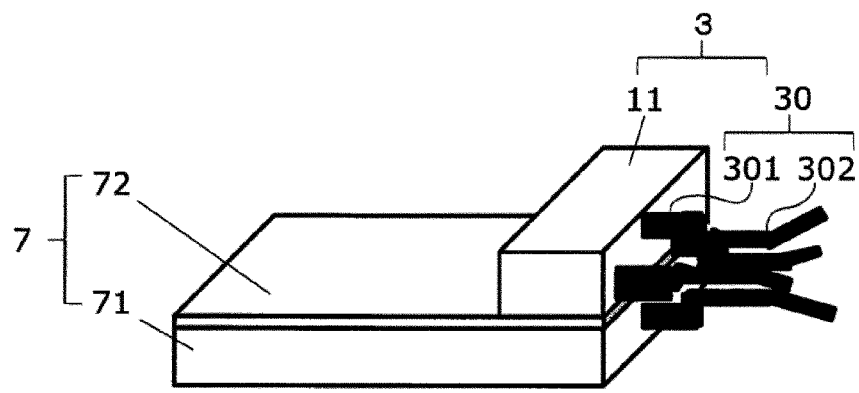
FIG. 3A is a perspective view schematically illustrating an optical fiber guide structure according to a third embodiment of the present invention.
Figure 3B:
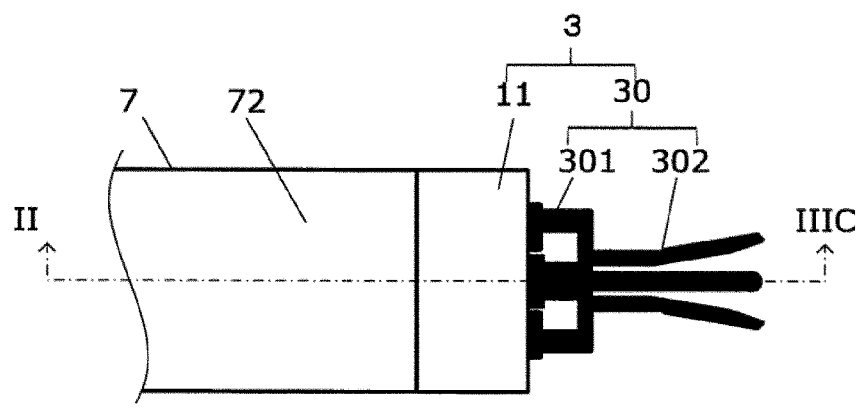
FIG. 3B is a top view schematically illustrating an optical fiber guide structure according to the third embodiment of the present invention.
Figure 3C:
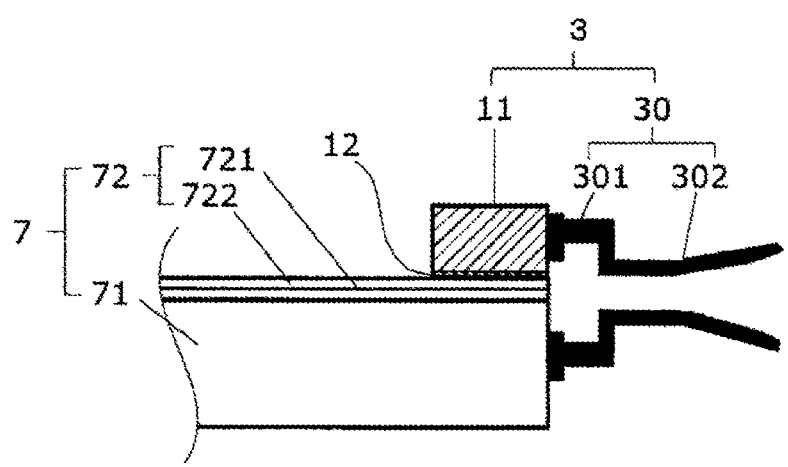
FIG. 3C is a cross-sectional view illustrating a cross section taken along a line IIIC-IIIC in FIG. 3B.
Figure 3D:
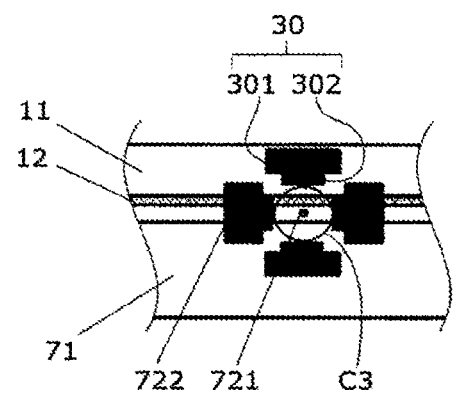
FIG. 3D is a front view schematically illustrating an optical fiber guide structure according to the third embodiment of the present invention.

As illustrated in FIG. 3C, the plurality of support members 30 is disposed such that the diameter of an inscribed circle C3 in a certain region along the longitudinal direction of the plurality of support members 30, more specifically the diameter of the inscribed circle C3 in contact with a plurality of the plate springs 302 is slightly smaller than the outer diameter of the optical fiber 60 in a plane perpendicular to the longitudinal direction of the support members 30.

In addition, as illustrated in FIG. 3C, the diameter of the inscribed circle C3 in contact with the plate springs 302 becomes larger toward the leading end of the support member 30, which facilitates the insertion of the fiber.

Figure 3E:
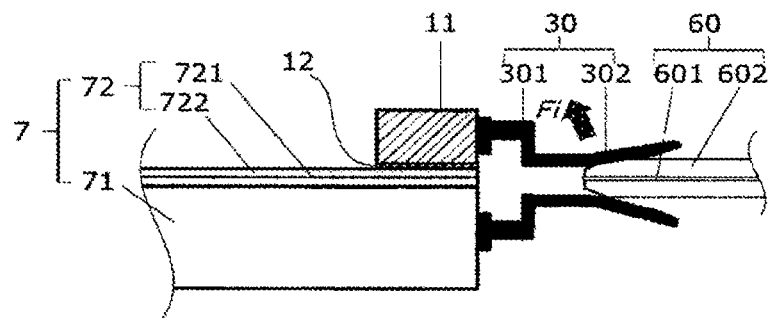
FIG. 3E is a schematic view illustrating an optical fiber guide structure and an optical fiber connection structure according to the third embodiment of the present invention.
Figure 3F:
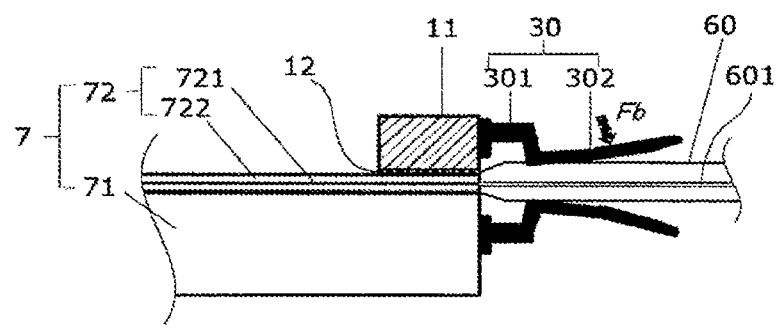
FIG. 3F is a schematic view illustrating an optical fiber guide structure and an optical fiber connection structure according to the third embodiment of the present invention.

Next, the action of the plurality of support members 30 when inserting the optical fiber 60 will be described with reference to FIGS. 3E and 3F.

As in the first embodiment and the second embodiment, in a specific region in the longitudinal direction of the plurality of support members 30, particularly at the plate springs 302, the diameter of the inscribed circle C3 is smaller than the outer diameter of the optical fiber 60. However, as illustrated in FIG. 3E, the plate spring 302 elastically deforms by receiving a force Fi from the optical fiber 60, thereby allowing the optical fiber 60 to be inserted. After the insertion of the optical fiber 60, as illustrated in FIG. 3F, the optical fiber 60 is supported in a state in which the plate springs 302 of the plurality of support members 30 cooperate with each other to apply, to the optical fiber 60, a compressive stress in the radial direction of the optical fiber 60, whereby clearance between the optical fiber 60 and the guide members 30 may be eliminated.

In the present embodiment, each of the plurality of support members 30 constituting the optical fiber guide structure includes the beam 301 and the plate spring 302 provided on the leading end of the beam 301. At the time of inserting the optical fiber 60, the plate spring 302 provided on the leading end of the beam 301 elastically deforms to open, so that a substantial stress is hardly transmitted to the beam 301 of the support member 30, particularly to a portion near the connection end surface of the optical waveguide device 7. With the above structure, an effect that the clearance between the support members 30 and the optical fiber 60 is eliminated and the optical fiber 60 can be connected to the optical waveguide device 7 with low loss, is exhibited. Furthermore, with the structure described above, the following effects may also be exhibited.

Each support member is constituted by the plate spring 302 and the beam 301 having a higher rigidity than the plate spring 302, and the plate spring 302 deforms when the optical fiber 60 is inserted, whereby the stress accompanying the insertion of the optical fiber 60 is unlikely to be transmitted to the joining portion of the beam 301 with the connection end surface of the optical waveguide device 7. Such a structure makes it possible to reduce the risk of the joining portion between the beam 301 of the guide member 30 and the connection end surface of the optical waveguide device 7 peeling when the optical fiber 60 is inserted.

The length, thickness, and the like of the plate spring 302 may be set appropriately in such a manner that the Young's modulus of the plate spring portion formed of a light curing resin becomes a suitable one in accordance with the joining strength between the optical waveguide device 7 and the guide member 30, the magnitude of the force received from the optical fiber 60 to be inserted, and the like. To further facilitate the deformation and secure the strength of the joining portion, for example, a meandering-type plate spring structure having a zig-zag shape may be formed as the plate spring 302 in order to lengthen a substantial length of the plate spring 302 of the support member 30.

Fourth Embodiment

Next, an optical fiber connection structure 4 according to a fourth embodiment of the present invention will be described with reference to FIGS. 4A to 4F.

Figure 4A:
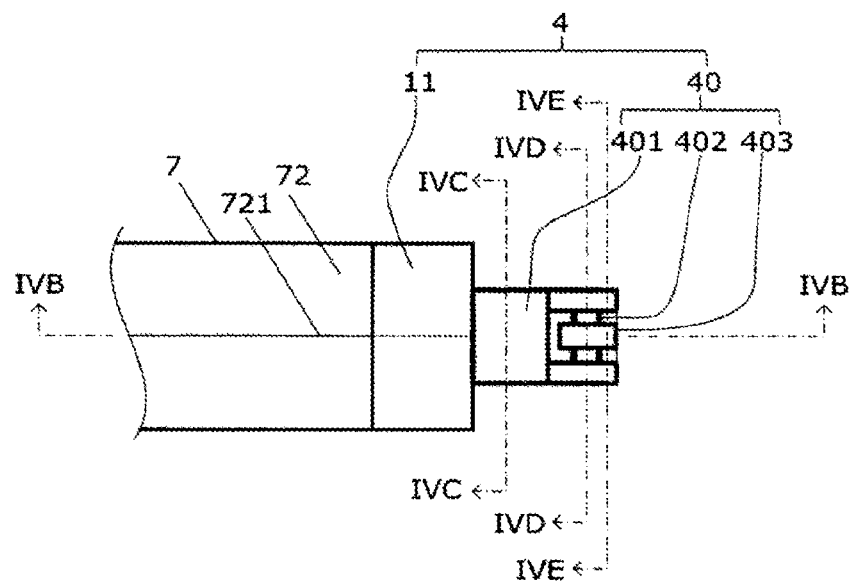
FIG. 4A is a top view schematically illustrating an optical fiber guide structure according to a fourth embodiment of the present invention.

As illustrated in FIG. 4A, a guide member 40 constitutes an optical fiber guide structure in the optical fiber connecting structure 4 according to the present embodiment. The guide member 40 includes a cylindrical member 401, a contact member 403, and a spring member 402. The cylindrical member 401 is formed in a cylindrical shape, and a notch is formed in a part thereof along the longitudinal direction. The contact member 403 is disposed in the notch, and makes contact with the side surface of the optical fiber 60 when the optical fiber 60 is inserted. The spring member 402 is set between the cylindrical member 401 and the contact member 403. To rephrase, as illustrated in FIG. 4A, the guide member 40 has a structure in which a portion thereof (the contact member 403) is suspended by the spring member 402 of a plate spring structure, when viewed from the top surface.

The description of the present embodiment is given in which a notch is provided in a part of the cylindrical member 401; however, instead of the notch, a through-hole that is open to a wall surface of the cylindrical member 401 may be provided.

Figure 4B:
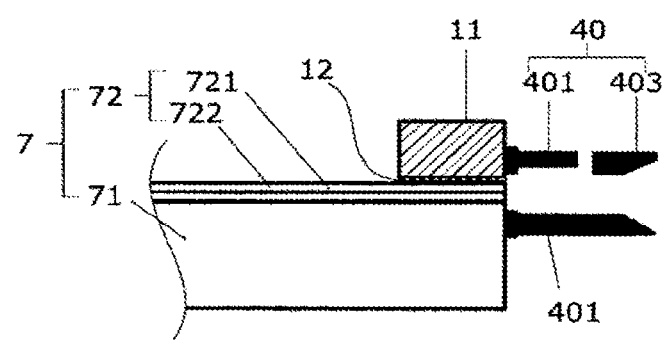
FIG. 4B is a cross-sectional view illustrating a cross section taken along a line IVB-IVB in FIG. 4A.
Figure 4C:
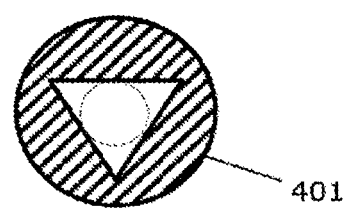
FIG. 4C is a cross-sectional view illustrating a cross section taken along a line IVC-IVC in FIG. 4A.

As illustrated in FIGS. 4A and 4B, the spring member 402 set between the cylindrical member 401 and the contact member 403 is provided along a direction intersecting the longitudinal direction of the guide member 40, and the contact member 403 is not directly connected to the cylindrical member 401 in the longitudinal direction.

In at least a specific region of the contact member 403 in the longitudinal direction, the diameter of an inscribed circle C4 in contact with an inner wall of the cylindrical member 401 and an inner side surface of the contact member 403 in a plane perpendicular to the longitudinal direction is set to be smaller than the outer diameter of the optical fiber 60 to be inserted.

Figure 4D:
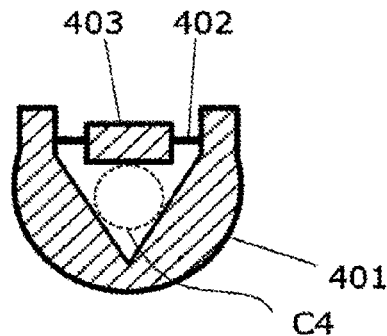
FIG. 4D is a cross-sectional view illustrating a cross section taken along a line IVD-IVD in FIG. 4A.
Figure 4E:
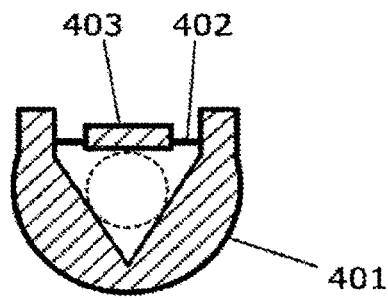
FIG. 4E is a cross-sectional view illustrating a cross section taken along a line IVE-IVE in FIG. 4A.

To guide the insertion of the optical fiber 60, as illustrated in FIGS. 4B, 4D, and 4E, one end side of the contact member is formed in a tapered shape in order to cause the inner diameter of an insertion opening on the opposite side to the connection end surface of the optical waveguide device 7 to be larger than the outer diameter of the optical fiber 60.

Figure 4F:
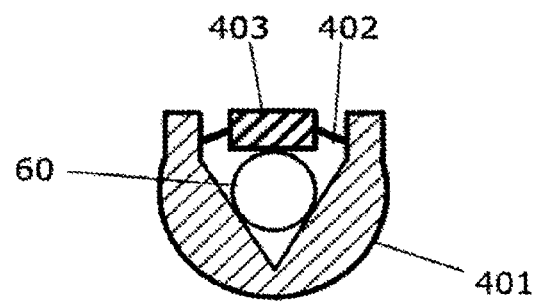
FIG. 4F is a cross-sectional view illustrating a cross section taken along the line IVE-IVE in FIG. 4A when an optical fiber is inserted into an optical fiber guide structure according to the fourth embodiment of the present invention.

Accordingly, in the state in which the optical fiber 60 is inserted, as illustrated in FIG. 4F, the guide member 40 makes contact with the leading end of the optical fiber 60, and a force from the optical fiber 60 toward the outer side of the radial direction is applied to the contact member 403 accompanying the insertion of the optical fiber 60; as a result, the plate spring member 402 is elastically deformed in a direction in which the inner diameter of the guide member 40 is expanded, thereby making it possible to insert the fiber. After the insertion of the optical fiber 60, as illustrated in FIG. 4F, a plurality of the spring members 402 cooperate with each other to support the optical fiber 60 in a state in which a compressive stress in the radial direction of the optical fiber 60 is applied to the optical fiber 60 via the contact member 403, whereby clearance between the optical fiber 60 and the guide member 40 may be eliminated. This allows the optical axis of the optical fiber to be uniquely defined.

In the guide member 40 constituting the optical fiber guide structure according to the present embodiment, the contact member 403 is not directly coupled to the cylindrical member 401 erected on the connection end surface of the optical waveguide device 7 in the longitudinal direction, as illustrated in FIG. 4A. With the above structure, an effect that the clearance between the guide member 40 and the optical fiber 60 is eliminated and the optical fiber 60 can be connected to the optical waveguide device 7 with low loss, is exhibited. Furthermore, with the structure described above, the following effects may also be exhibited.

That is, because the contact member 403 is coupled to the cylindrical member 401 by the spring member 402 provided in a direction orthogonal to the longitudinal direction, and is not directly coupled to the cylindrical member 401 in the longitudinal direction, the stress accompanying the insertion of the optical fiber 60 is not directly transmitted to the cylindrical member 401. Accordingly, even when the inner diameter of the inscribed circle, which is inscribed with respect to the cylindrical member 401 and the cylindrical member 401 in a plane perpendicular to the longitudinal direction including the cylindrical member 401, is set to be smaller than the outer diameter of the optical fiber 60, the risk of the joining portion between the cylindrical member 401 and the connection end surface of the optical waveguide 7 peeling due to the stress accompanying the insertion of the optical fiber may be reduced because the contact member 403 is not directly coupled to the cylindrical member 401 erected on the connection end surface of the optical waveguide device 7 in the longitudinal direction.

First Modification Example of Fourth Embodiment

Figure 5:
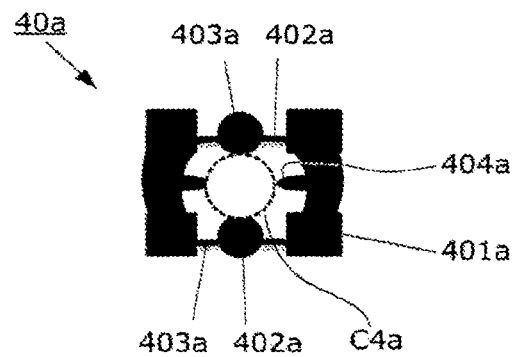
FIG. 5 is a cross-sectional view illustrating a modification example of an optical fiber guide structure according to the fourth embodiment of the present invention.

As a modification example of the optical fiber guide structure according to the present embodiment, for example, as illustrated in FIG. 5, it is conceivable that a plurality of suspension bridge structures each constituted by a spring member 402a and a contact member 403a are provided at symmetrical positions sandwiching the axis of a cylindrical member 401a. At this time, a projection 404a configured to support the optical fiber 60 may be provided on the inner wall of the cylindrical member 401a. In a plane passing through the contact member 403a and perpendicular to the longitudinal direction of a guide member 40a, the diameter of an inscribed circle C4a in contact with an inner surface of the contact member 403a is set to be smaller than the outer diameter of the optical fiber 60 to be inserted.

The guide member 40a illustrated in FIG. 5 is an example in which two contact members 403a are disposed at symmetrical positions sandwiching the axis of the cylindric member 401a, but three or more contact members 403a may be disposed at rotationally symmetrical positions with respect to the axis, and each of the contact members 403a may be connected to the cylindrical member 401a by the spring member 402a.

Figure 6A:
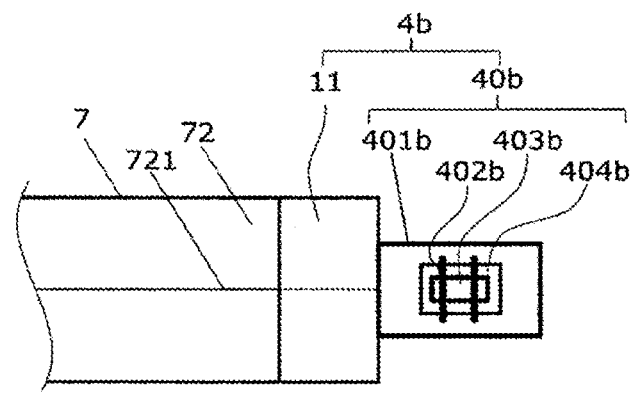
FIG. 6A is a top view illustrating another modification example of an optical fiber guide structure according to the fourth embodiment of the present invention.
Figure 6B:
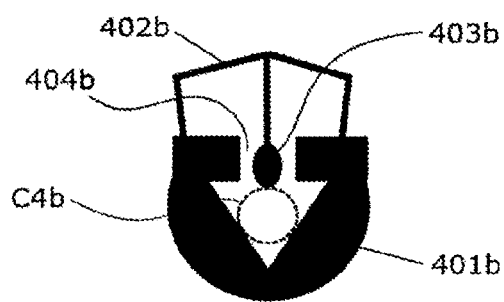
FIG. 6B is a cross-sectional view illustrating another modification example of an optical fiber guide structure according to the fourth embodiment of the present invention.

Another modification example is illustrated in FIGS. 6A and 6B. The basic structure of a guide member 40b according to another modification example is the same as that of the fourth embodiment described above with respect to a point that a contact member 403b is disposed in a through-hole formed in a part of a side wall of a cylindrical member 401b. However, in this other modification example, the structure of the guide member 40b is such that a spring member 402b having a beam structure is provided on an outer wall of the cylindrical member 401b, and the contact member 403b is supported by the spring member 402b. As illustrated in FIG. 6B, the contact member 403b is disposed in such a manner that a part thereof projects into the through-hole that is formed inside the cylindrical member 401b and that has a substantially triangular cross section. At this time, the spring member 402b and the contact member 403b are provided in such a manner that the diameter of an inscribed circle C4b in contact with the contact member 403b and an inner wall of the cylindrical member 401b is smaller than the outer diameter of the optical fiber 60 in a plane perpendicular to the longitudinal direction of the guide member 40b.

As a result, at the time of the optical fiber 60 being inserted, the side surface of the optical fiber 60 is brought into contact with the contact member 403b, and the spring member 402b is elastically deformed by receiving a force from the optical fiber 60, so that the optical fiber 60 is inserted, thereby making it possible to achieve a connection while eliminating the clearance.

The plurality of suspension bridge structures each constituted by the spring member 402b having a beam structure and the contact member 403b may be present along the circumference of the cylindrical member 401b.

Any of the guide member 40 constituting the optical fiber guide structure according to the fourth embodiment described above and the guide members 40a, 40b according to the modification examples thereof can be easily formed by the three-dimensional forming technique described above.

Fifth Embodiment

Next, a guide member 50 in an optical fiber connection structure 5 according to a fifth embodiment of the present invention will be described with reference to FIGS. 7A to 7D.

Figure 7A:
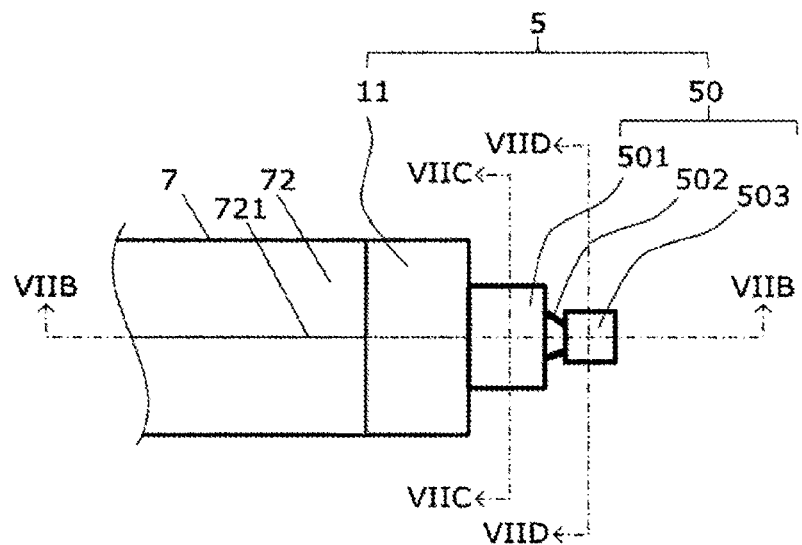
FIG. 7A is a top view schematically illustrating an optical fiber guide structure according to a fifth embodiment of the present invention.

As illustrated in FIG. 7A, the guide member 50, which constitutes an optical fiber guide structure, includes a first cylindrical member 501 with one end thereof connected to the connection end surface of the optical waveguide device 7, a second cylindrical member 503 disposed with the axis thereof coincident with the axis of the first cylindrical member 501, and a coupling member 502 configured to couple the first cylindrical member 501 and the second cylindrical member 503 to each other. The coupling member 502 is, for example, a beam having a plate spring structure. These members, namely, the first cylindrical member 501, the coupling member 502, and the second cylindrical member 503 are each formed of an elastically deformable material.

Figure 7B:
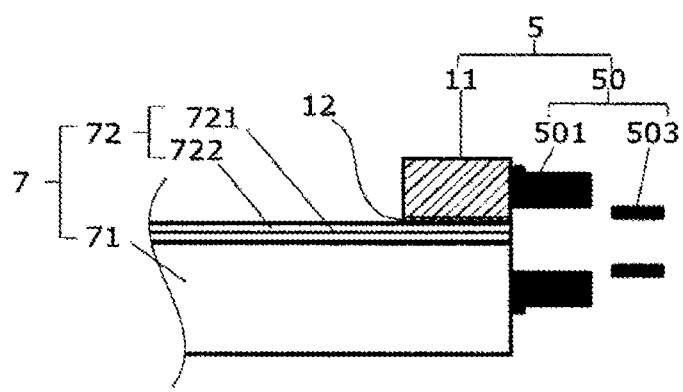
FIG. 7B is a cross-sectional view illustrating a cross section taken along a line VIIB-VIIB in FIG. 7A.
Figure 7C:
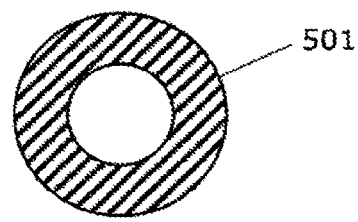
FIG. 7C is a cross-sectional view illustrating a cross section taken along a line VIIC-VIIC in FIG. 7A.
Figure 7D:
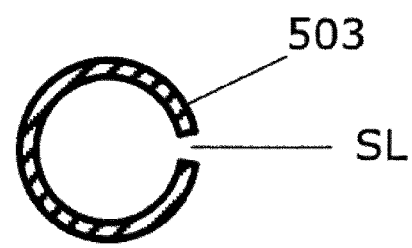
FIG. 7D is a cross-sectional view illustrating a cross section taken along a line VIID-VIID in FIG. 7A.

As illustrated in FIGS. 7B, 7C, and 7D, the first cylindrical member 501 and the second cylindrical member 503 are both formed in a cylindrical shape. The inner diameter of the second cylindrical member 503 is smaller than the inner diameter of the first cylindrical member 501 as well as the outer diameter of the optical fiber 60 to be inserted. A slit SL is formed along the axial direction in a side surface of the second cylindrical member 503.

Thus, in the second cylindrical member 503, the inner diameter thereof is set to be smaller than the outer diameter of the optical fiber 60. However, the slit SL is provided in the side surface thereof, and the second cylindrical member 503 is formed of an elastically deformable material. Because of this, when the optical fiber 60 is inserted therein, the second cylindrical member 503 itself elastically deforms in a direction in which the inner diameter thereof expands, thereby allowing the fiber to be inserted. After the insertion, the optical fiber 60 is supported in a state in which a compressive stress is applied to the optical fiber 60 in the radial direction of the optical fiber 60. With this, clearance between the optical fiber 60 and the guide member 50, specifically the clearance with the second cylindrical member 503 may be eliminated, and the optical axis of the optical fiber 60 may be uniquely defined.

In the guide member 50, as illustrated in FIGS. 7A and 7B, the second cylindric member 503 is connected to the first cylindrical member 501 via the coupling member 502, and does not directly make contact with the first cylindrical member 501 in the longitudinal direction. Accordingly, when the coupling member 502 is constituted by a beam having a plate spring structure, the stress generated when inserting the optical fiber 60 into the second cylindrical member 503 having an inner diameter smaller than the outer diameter of the optical fiber 60 is not directly transmitted to the first cylindrical member 501 erected on the connection end surface of the optical waveguide device 7 and the side surface of the reinforcement plate 11, and therefore it is possible to eliminate the risk of a joining portion between the first cylindrical member 501 and the connection end surface of the optical waveguide device 7 as well as the side surface of the reinforcement plate 11 peeling.

Figure 8:
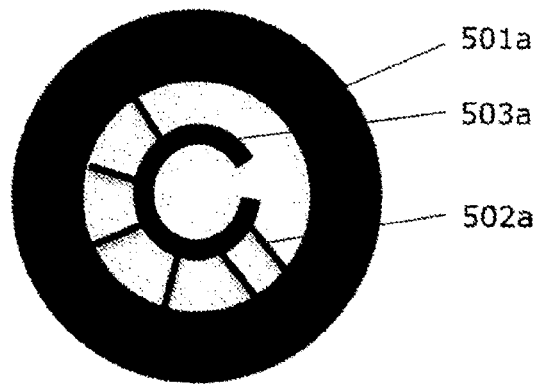
FIG. 8 is a cross-sectional view illustrating another modification example of an optical fiber guide structure according to the fifth embodiment of the present invention.
Figure 9A:
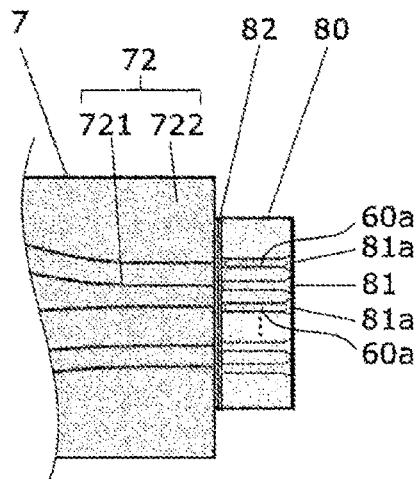
FIG. 9A is a top view schematically illustrating an example of an optical fiber connection structure of conventional art.
Figure 9B:
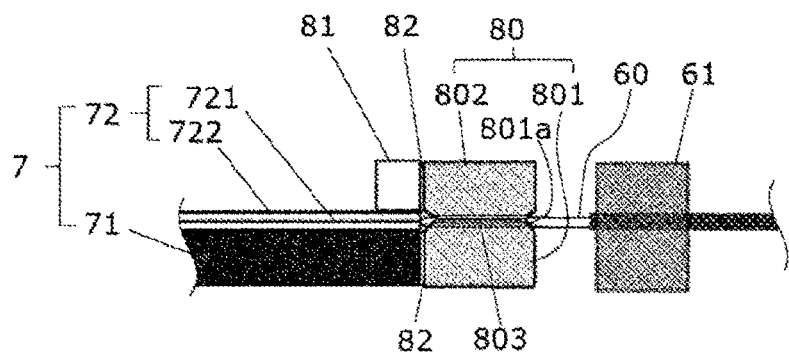
FIG. 9B is a side view schematically illustrating an example of an optical fiber connection structure of conventional art.

In the guide member 50 described above, as illustrated in FIG. 8, a plurality of coupling members 502a each formed of a beam of a plate spring structure can be provided, and the number and arrangement positions thereof are optional.

The guide member 50 can also be easily formed by the three-dimensional forming technique described above or the like.

INDUSTRIAL APPLICABILITY

Embodiments of the present invention can be applied to techniques for connecting an optical fiber to an optical waveguide device.

REFERENCE SIGNS LIST

1 Optical fiber connection structure
10, 20, 40, 50 Guide member
30 Support member
11 Reinforcement plate
60 Optical fiber
7 Optical waveguide device
72 Optical waveguide layer
721 Core

The invention claimed is:

1. An optical fiber guide structure comprising:
a guide member configured to provide a space for accommodating a leading end portion of an optical fiber to be connected to a connection end surface of an optical waveguide device,
wherein the guide member comprises an elastically deformable material,
wherein a side surface of the elastically deformable material of the guide member is in direct physical contact with the connection end surface of the optical waveguide device, and
wherein in a first region along a longitudinal direction of the guide member, a diameter of an inscribed circle in contact with an inner wall of the guide member in a plane perpendicular to the longitudinal direction is smaller than an outer diameter of the optical fiber,
wherein the guide member is constituted by N support members, wherein N is an integer equal to or greater than three, wherein each of the N support members includes:
a beam having a first end connected to another one of the N support members; and
a plate spring extending along a longitudinal direction from a second end of the beam, and
wherein a respective plate spring of each of the N support members is configured such that a diameter of an inscribed circle in contact with the respective plate spring in a plane perpendicular to the longitudinal direction is smaller than the outer diameter of the optical fiber in at least a second region along the longitudinal direction.

2. The optical fiber guide structure according to claim 1, wherein the diameter of the inscribed circle that is inscribed with respect to the guide member in the plane perpendicular to the longitudinal direction becomes larger toward an end portion of the guide member on a side where the optical fiber is to be inserted.

3. An optical fiber connection structure comprising:
a reinforcement member at a connection end surface of an optical waveguide device and disposed over a first surface of the optical waveguide device; and
an optical fiber guide structure disposed on a surface formed by the connection end surface of the optical waveguide device and a side surface of the reinforcement member, wherein the optical fiber guide structure comprises a guide member configured to provide a space for accommodating a leading end portion of an optical fiber to be connected to the connection end surface of the optical waveguide device,
wherein the guide member comprises an elastically deformable material,
wherein a side surface of the elastically deformable material of the guide member is in direct physical contact with the connection end surface of the optical waveguide device and in direct physical contact with the side surface of the reinforcement member, and
wherein in a first region along a longitudinal direction of the guide member, a diameter of an inscribed circle in contact with an inner wall of the guide member in a plane perpendicular to the longitudinal direction is smaller than an outer diameter of the optical fiber.

4. The optical fiber connection structure according to claim 3, wherein the guide member includes a projecting portion having a cylindrical shape, wherein in the projecting portion of the guide member, a portion of a wall surface of the guide member extends toward an inner side of the space in the first region, and wherein when the optical fiber is inserted, a compressive stress in a radial direction of the optical fiber is applied to the optical fiber by elastic deformation of the portion of the wall surface by the projecting portion.

5. The optical fiber connection structure according to claim 3, wherein the guide member has a cylindrical shape and includes a plurality of slits along a longitudinal direction on a side on which the optical fiber is configured to be inserted, and wherein in a first region where the plurality of slits are formed within the guide member, the diameter of the inscribed circle in contact with the inner wall of the guide member in the plane perpendicular to the longitudinal direction is smaller than the outer diameter of the optical fiber.

6. The optical fiber connection structure according to claim 3, wherein the guide member is constituted by N support members, wherein N is an integer equal to or greater than three, wherein each of the N support members includes:
   a beam having a first end connected to another one of the N support members; and
   a plate spring extending along a longitudinal direction from a second end of the beam, and
   wherein a respective plate spring of each of the N support members is configured such that a diameter of an inscribed circle in contact with the respective plate spring in a plane perpendicular to the longitudinal direction is smaller than the outer diameter of the optical fiber in at least a second region along the longitudinal direction.

7. The optical fiber connection structure according to claim 3, wherein the guide member includes:
   a cylindrical member having a cylindrical shape and having either a through-hole or a notch that opens in a part of the cylindrical member along the longitudinal direction;
   a contact member disposed in either the through-hole or the notch and configured to make contact with a side surface of the optical fiber when the optical fiber is inserted; and
   a spring member between the cylindrical member and the contact member, wherein in a third region of the contact member, the diameter of the inscribed circle in contact with the inner wall of the cylindrical member and an inner surface of the contact member in the plane perpendicular to the longitudinal direction is smaller than the outer diameter of the optical fiber.

8. The optical fiber connection structure according to claim 3, wherein the guide member includes:
   a first cylindrical member;
   a second cylindrical member having a slit formed along an axial direction in a side surface of the second cylindrical member; and
   a coupling member configured to couple the first cylindrical member and the second cylindrical member to each other with axes of the first and second cylindrical members being matched, wherein an inner diameter of the second cylindrical member is smaller than the outer diameter of the optical fiber to be inserted into the second cylindrical member.

9. The optical fiber connection structure according to claim 3, wherein the diameter of the inscribed circle that is inscribed with respect to the guide member in the plane perpendicular to the longitudinal direction becomes larger toward an end portion of the guide member on a side where the optical fiber is to be inserted.

* * * * *